Sept. 30, 1958 A. R. MORGAN 2,854,526

MAGNETIC RECORDING

Filed Feb. 10, 1955 4 Sheets-Sheet 1

INVENTOR.
Adolph R. Morgan
BY Morris A. Rabkin
ATTORNEY.

Sept. 30, 1958 A. R. MORGAN 2,854,526

MAGNETIC RECORDING

Filed Feb. 10, 1955 4 Sheets-Sheet 2

INVENTOR.
Adolph R. Morgan
BY
ATTORNEY.

INVENTOR.
Adolph R. Morgan
BY
Morris A. Rabkin
ATTORNEY.

Sept. 30, 1958 A. R. MORGAN 2,854,526

MAGNETIC RECORDING

Filed Feb. 10, 1955 4 Sheets-Sheet 4

INVENTOR.
Adolph R. Morgan
BY
Morris Rabkin
ATTORNEY.

United States Patent Office 2,854,526

Patented Sept. 30, 1958

2,854,526

MAGNETIC RECORDING

Adolph R. Morgan, Princeton, N. J., assignor to Radio Corporation of America, a corporation of Delaware Application February 10, 1955, Serial No. 487,293

10 Claims. (Cl. 179—100.2)

This invention relates to magnetic recording, and more particularly to improved means and method for neutralizing or overcoming the effect of irregularities in the linear motion of a tape record member.

Heretofore, magnetic record members have been used to carry signals corresponding to audio frequency intelligence. The linear motions of such tape record members have been suitably stabilized by such apparatus as capstans driven at a constant speed and carrying relatively heavy flywheels. Any remaining irregularity in the tape motion is negligible since it is not offensive in the reproduction of the recorded audio frequency signals. However, when it is desired to record information having signal components which are considerably higher than audio frequency signals such, for example, as signals used for visual displays for television or the like, irregularities in the motion of the tape remaining after such stabilization as hereinbefore indicated is intolerable.

Accordingly, it is an object of the present invention to provide an improved magnetic tape recording-reproducing system wherein means are provided for overcoming the effects of irregularities in the linear motion of the tape.

It is another object of this invention to provide an improved magnetic recording-reproducing system as set forth which is characterized in greater stability in the reproduced signals from the magnetically recorded tape.

It is a further object of this invention to provide an improved magnetic recording-reproducing system as set forth wherein means are provided to establish the utmost stability in the tape motion during recording and further means are provided for neutralizing the effect upon the reproduced signal of inadvertent irregularity in the tape motion.

In accomplishing these and other objects, there has been provided a magnetic recording-reproducing system wherein, during the recording process, servo-mechanism means are provided for regulating the speed of a capstan used to drive the tape. Also during the recording process, a control signal is recorded on the record receiving member. During playback operation, the recorded control signal is detected by a first pickup head and the signal developed thereby is compared in phase with a standard signal to control the operation of the aforesaid capstan. The control signal is also detected by a second pickup head which is rotatable about an axis which coincides with the center of curvature of the tape contacting face of the head. The signal developed by the second pickup head is compared in phase with the standard signal and the resultant signal is applied to control the rotation of the second head about its axis. The operation of this second head substantially neutralizes the effect upon the reproduced signal of any residual irregularity remaining in the tape over and above that which can be controlled by the capstan.

A better understanding of this invention may be had from the following detailed description when read in connection with the accompanying drawing in which.

Figure 1:
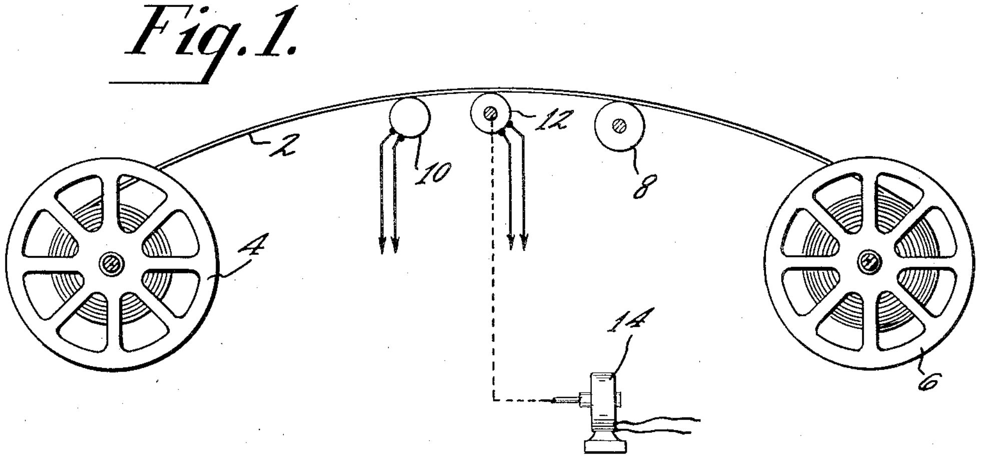
Fig. 1 is a schematic representation of a magnetic recording system embodying the present invention.

Referring now to the drawings in more detail, there is shown in Fig. 1 a magnetic tape record member 2 which is adapted to be driven from a supply reel 4 to a takeup reel 6 by a capstan 8. In its passage from the supply reel 4 to the takeup reel 6, the tape 2 passes two transducing stations. The first of these transducing stations will be called a fixed transducer 10. The second one is a rotatable transducer 12. The rotatable transducer is coupled to be driven, through a very slight arc, by a suitable motor or driving element 14 as will be more fully set forth hereinafter.

Figure 2:
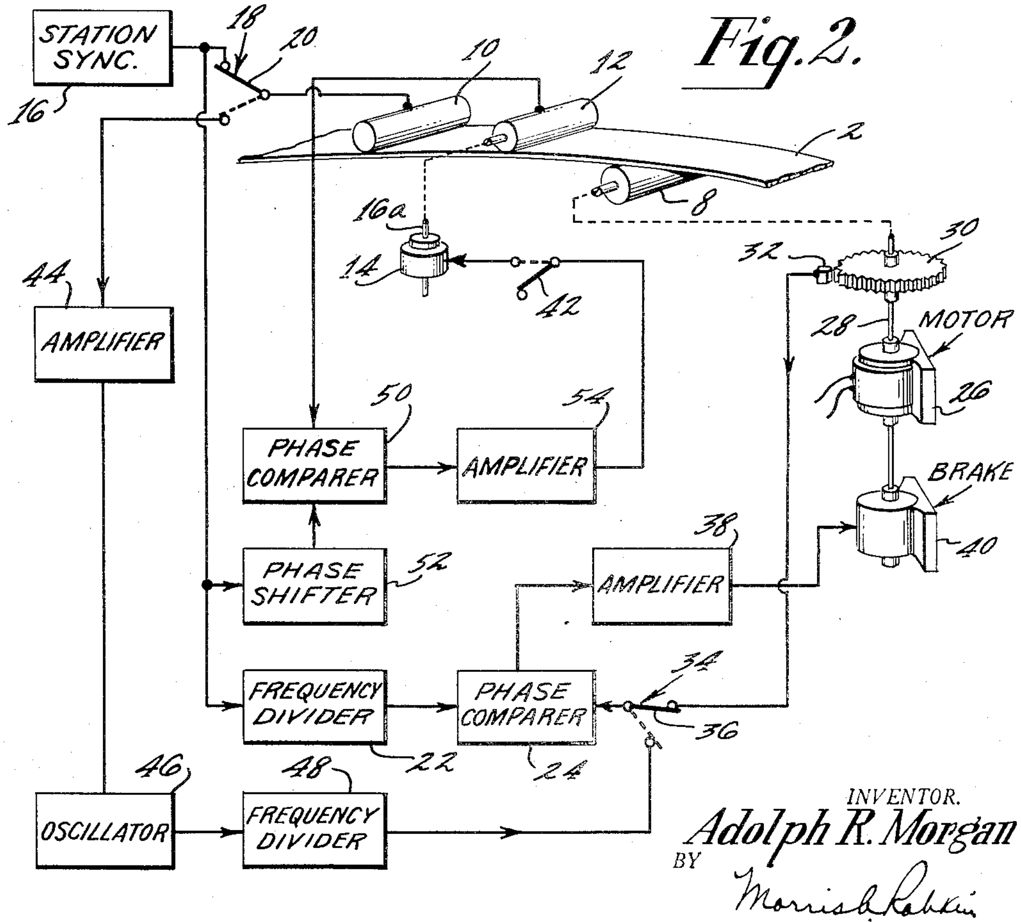
Fig. 2 is a diagrammatic view showing a circuit arrangement for effecting the control according to the present invention.

In Fig. 2, it will be seen that a standard signal such as a locally generated control signal or station sync signal is supplied from a source 16. In the event of the standard signal being the station sync signal developed in a television studio, the frequency of the signal corresponds to the horizontal sweep frequency of the television raster. At present, this is standardized at 15,750 cycles per second. The output from the source of signal 16 is connected to one terminal of a switch 18. The moving blade 20 of the switch 18 is connected to the fixed transducer 10. As shown in the drawings, the tape member 2 is a relatively wide tape capable of carrying several parallel record tracks. The illustrated transducer 10 includes a unitary structure which may comprise a plurality of signal translating heads mounted in side by side relation for cooperative engagement with each of the several parallel record tracks. One of this plurality of heads will be employed to engage the record track which accommodates the control signal.

The source of control signals 16 is also connected to a suitable frequency divider 22 which may be any of several well known circuits for producing a signal of appreciably lower frequency than the input signal. In one apparatus constructed in accordance with the present invention, there was employed a frequency divider which divided the input frequency by a factor of 12, thus producing a signal whose frequency was 1312.5 cycles per second. This signal, the output of the frequency divider 22, is fed to a phase comparing device 24.

The capstan 8 is driven by a motor 26 through a shaft 28. Coupled to the motor shaft 28, or mounted thereon as shown in the drawing, is a tone wheel 30 which rotates with the shaft 28. A pickup device 32 is coupled to the tone wheel in such a manner as to produce a signal whose frequency is a function of the angular velocity of the tone wheel 30 and, hence, of the angular velocity of the capstan. This pickup device 32 may be a magnetic structure which is inductively coupled to a toothed wheel of magnetic material. Such an arrangement produces an electrical signal in the pickup device at each passage of a tooth of the tone wheel. The signals generated by the pickup device are fed to one terminal of a switch 34. The movable blade 36 of the switch 34 is connected to the phase comparer 24.

The tone wheel and the pickup device are so arranged that when the capstan is rotating at a predetermined desired velocity, the signals generated as a result of the rotation of the tone wheel 30 will be of a frequency which is identical with the output of the frequency divider 22. In the illustrative embodiment previously referred to, that frequency was 1312.5 cycles per second.

The phase comparer, which will be discussed in greater detail hereinafter, compares the signals fed thereto from the frequency divider and from the tone wheel and produces a signal which is a function of the phase relationship of these two signals. The signal from the phase comparer 24 is fed to an amplifier 38 and thence to an eddy-current brake 40. The eddy-current brake 40 may be of any suitable type well known in the art. The eddy-current brake 40 is operable upon the application of a variable amount of direct current applied to a coil 156 (shown in Fig. 5) therein, to increase or decrease the load upon and, hence, the speed of the capstan driving motor.

The switch 18 and the switch 34 are shown, in Fig. 2, in the recording condition. In this condition, the control signal from the source 16 is applied to the transducer 10 and is recorded in the appropriate track on the tape record member 2. During the reproduce phase of the operation of the recording system, the switch 18 is closed as shown in dotted line in Fig. 2 as is the switch 34. A third switch 42 may be open, as illustrated, during the recording operation and may be closed, as shown in dotted line, during the reproducing operation. This third switch 42 is included in the circuit arranged to effect a control of the rotatable transducer 12. The switch 42 may, of course, be closed during recording to render the rotatable head operable for monitoring purposes.

In the reproducing condition, the control signal which was recorded on the magnetic tape record member 2 by the fixed transducer 10 is now read by the same transducer. This detected signal is applied through the switch 18 to an amplifier 44 thence to control an oscillator 46. The oscillator 46 is of a type which may be pretuned to a desired frequency and then locked onto an incoming signal which has approximately the same frequency. In this manner, if the incoming signal varies slightly in frequency, the frequency of the output of the oscillator will vary with the frequency of the incoming signal. However, if the incoming signal is found to have a pulse or signal missing, through signal dropout, for example, the oscillator will run free long enough to supply the missing pulse. The output of the oscillator is fed to a frequency divider 48 which is substantially the same as the frequency divider 22 previously discussed. This divides the frequency of the signal applied thereto by a factor of 12. The output of the frequency divider is coupled through the switch 34 to the input of the phase comparer 24.

The locally generated control signal or station sync from the source 16 is again applied through the frequency divider 22 to the input of the phase comparer 24. The phase comparer again compares the phase relationship of the control signal with the signal derived, this time, from the tape. The output of the phase comparer 24, which is an indication of a phase deviation between the two compared signals, is fed through the amplifier 38 to again control the eddy-current brake 40 to effect a control of the capstan motor 26.

The control signals recorded on the magnetic tape record member are also detected during reproduce condition by an appropriate head in the rotatable transducer 12. The detected control signal is fed to a phase comparer 50. A signal is also fed from the source 16 through a phase shifter 52 thence into the phase comparer 50. In the phase comparer 50, the control or station sync signals are compared in phase with the detected control signals being supplied from the rotatable transducer 12. The output of the phase comparer, which is an indication of a phase deviation between the two sets of signals is fed through an amplifier 54 to a driving member or motor 14 which is coupled to control the movement of the rotatable head 12 through a limited rotational movement in a direction to reduce the phase deviation.

As thus indicated, the speed of the rotation of the capstan is controlled during the recording process by controlling the amount of braking force applied to the capstan shaft. The braking force is a function of the deviations in phase between a control signal and the signal generated by the tone wheel.

Since during the recording operation, there is no way of accurately determining the velocity of the tape itself, the velocity of the capstan, hence, of the tone wheel, is taken as an indication of the velocity of the tape. During playback, it then becomes desirable to reproduce the signal as accurately as possible with a minimum of phase deviation with respect to a control signal. To accomplish this, it becomes desirable to reproduce the motion of the tape to match as nearly as possible the motion during recording or to compensate for any change in the dimension of the tape occurring between the time of recording and the time of reproducing. Since the control signal was recorded on the tape during the recording operation, this recorded control signal may be compared with the locally generated control signal or station sync. This gives, to a large degree, a control over the linear velocity of the tape which very closely approximates a motion in the tape such that the reproduced signals will occur in the same phase relationship with respect to the locally generated control signal or station sync as when they were recorded. However minor deviations from this relationship may remain in the tape which would prove to be intolerable when the signals are for visual display.

Thus, the recorded control signal is also detected by the corresponding head in the rotatable transducer 12. This transducer arrangement also includes a plurality of signal translating heads within the unitary structure. Here too, one of the heads 49 (shown in Fig. 3) within the unitary structure is positioned to engage the channel carrying the control signal. The control signal detected by this head is compared in phase with the locally generated sync and slight rotational movement of the head is imparted through the motor 14 as a function of the deviation in phase between the two signals. Such an arrangement further reduces any tendency for the reproduced signals to deviate from the phase or frequency relationships with respect to the station sync signal.

Figure 3:
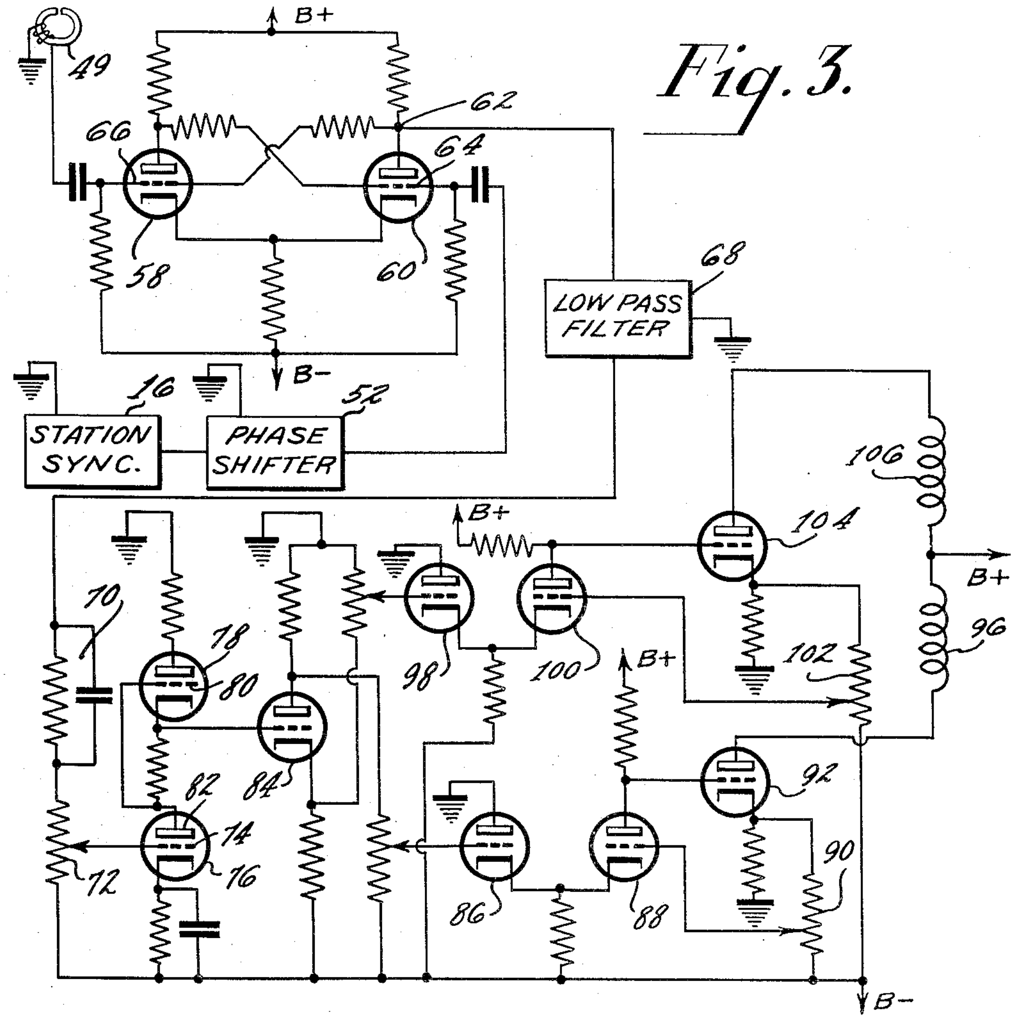
Fig. 3 is a schematic circuit diagram showing details of that portion of the circuit of Fig. 2 which serves to control the operation of the rotatable pickup head.

To better understand the operation of the aforementioned circuitry, reference will now be had to Fig. 3 which is a schematic diagram giving details of a circuit arrangement which may be used to control the operation of the rotatable transducer 12.

The head 49 is coupled to one input circuit of a bistable flip-flop which includes a first vacuum tube 58 and a second vacuum tube 60. These tubes are interconnected in a manner now well known in the art such that when one of the two vacuum tubes are conditioned to a state of conduction, the other tube, through the interconnection, is conditioned to be nonconducting. The station sync or control signals are coupled through a phase shifter 52 to a second input circuit of the flip-flop arrangement. Assuming for the moment that the first tube 58 is conditioned to be conductive, a negatively directed signal pulse from the head 49 is applied to the input circuit of the first tube 58 causing the tube to become nonconductive. While the first tube 58 was conductive, the second tube 60 was rendered nonconductive. Thus, the signal appearing at the output junction 62 was positive. When the first tube was rendered nonconducting, the potential applied to the control grid of the second tube 60 was increased, causing that tube to become conductive, reducing the potential at the output junction 62.

Figure 4:
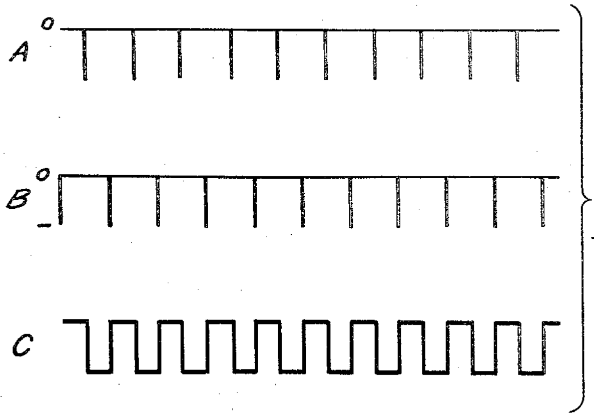
Fig. 4 is a chart showing the relationship of signals as they occur in the circuit shown in Fig. 3.

The next signal to arrive at the flip-flop is a negatively directed pulse from the station sync. This is applied to control grid 64 of the input circuit of the second tube 60. This renders the second tube nonconductive, increasing the potential at the junction 62 and, hence, on the control grid 66 of the first tube 58, rendering that tube conductive. The relationship between the signals applied to the flip-flop from the head 49 and from the station sync 16, and also the relationship of the output signal from the flip-flop, is shown in Fig. 4. In Fig. 4, curve A is representative of the series of negative pulses applied to the control grid 66 of the first vacuum tube 58 from the head 49. Curve B is representative of the series of negative pulses applied to the control grid 64 of the second tube 60 and curve C is representative of the output signal developed at the junction 62 as a result of the operation of the flip-flop. The output from the flip-flop is utilized to operate the driving motor 14 which, in turn, rotates the movable transducer 12.

The relationship of the servo arrangement is such that the system is stabilized when the positive and negative signals output from the flip-flop are substantially equal. This relationship occurs when the signals applied to one of the control grids are substantially displaced in phase to occur half way between the signals applied to the other of the control grids. In the present system, the phase difference, if allowed to occur naturally, would result in an undesirable motion in the rotatable transducer. Therefore, between the source of standard signals or station sync 16 and the input to the flip-flop there is inserted a phase shifter which shifts the phase of the control or station sync signal by an amount to pre-establish the desired relationship. The ultimate result of such an arrangement is that the servo system is stabilized with the recorded signals being in synchronization and in phase with the station sync or control signals.

The signal output from the flip-flop is fed through a low pass filter 68. The filter 68 is adjusted or designed to block the signals at the frequency of the output from the flip-flop. Such an arrangement leaves a signal output from the filter which is substantially a direct current whose level varies in accordance with the amount and direction of the phase difference between the two trains of signals applied to the respective input circuit of the flip-flop. The output of the filter 68 is fed through a phase advancing network which includes the filter 70 and a potentiometer 72. A portion of this signal is applied to the control grid 74 of a D. C. amplifier 76. The tube 78 in the anode circuit of the amplifier 76 has its control grid 80 directly coupled to the anode 82 and serves as a variable impedance in the anode circuit of the amplifier 76. This arrangement serves to stabilize the operation of the D. C. amplifier 76.

The output of the D. C. amplifier is applied to a phase inverter 84. From the phase inverter there is derived a pair of signals, one from the anode circuit and one from the cathode circuit, which are identical but opposite in phase. The signal derived from the anode circuit is applied to the cathode coupled amplifier comprising tubes 86 and 88. The control grid of the tube 88 is connected to a potentiometer 90 which is in the cathode circuit of a power amplifier 92. The control grid 94 of the power amplifier 92 is coupled to the output of the tube 88. The coupling of the tube 88 to the potentiometer in the cathode circuit of the tube 92 serves to stabilize the operation of the amplifier, reducing unwanted drift. The output of the power amplifier 92 is connected to one set of coils 96 on the motor 14 which controls the motion of the movable transducer 12.

Similarly, the signal derived from the cathode circuit of the phase inverter 84 is applied to a second cathode coupled amplifier which comprises the tubes 98 and 100. The control grid of the tube 100 is coupled to a potentiometer 102 which is in the cathode circuit of a power amplifier 104. The control grid of the power amplifier 104 is coupled to the output of the tube 100. The output of the power amplifier 104 is coupled to a second set of coils 106 on the motor 14. Thus, the variation in the current level, which is indicative of an out-of-phase condition of the signals derived from the tape with respect to the locally generated control signals or station sync, is amplified and applied in push-pull manner to the coils on the transducer control motor 14, causing a rotation of the motor which produces a corresponding rotation of the transducer in a direction to reestablish an in-phase relationship between the two sets of signals.

Figure 5:
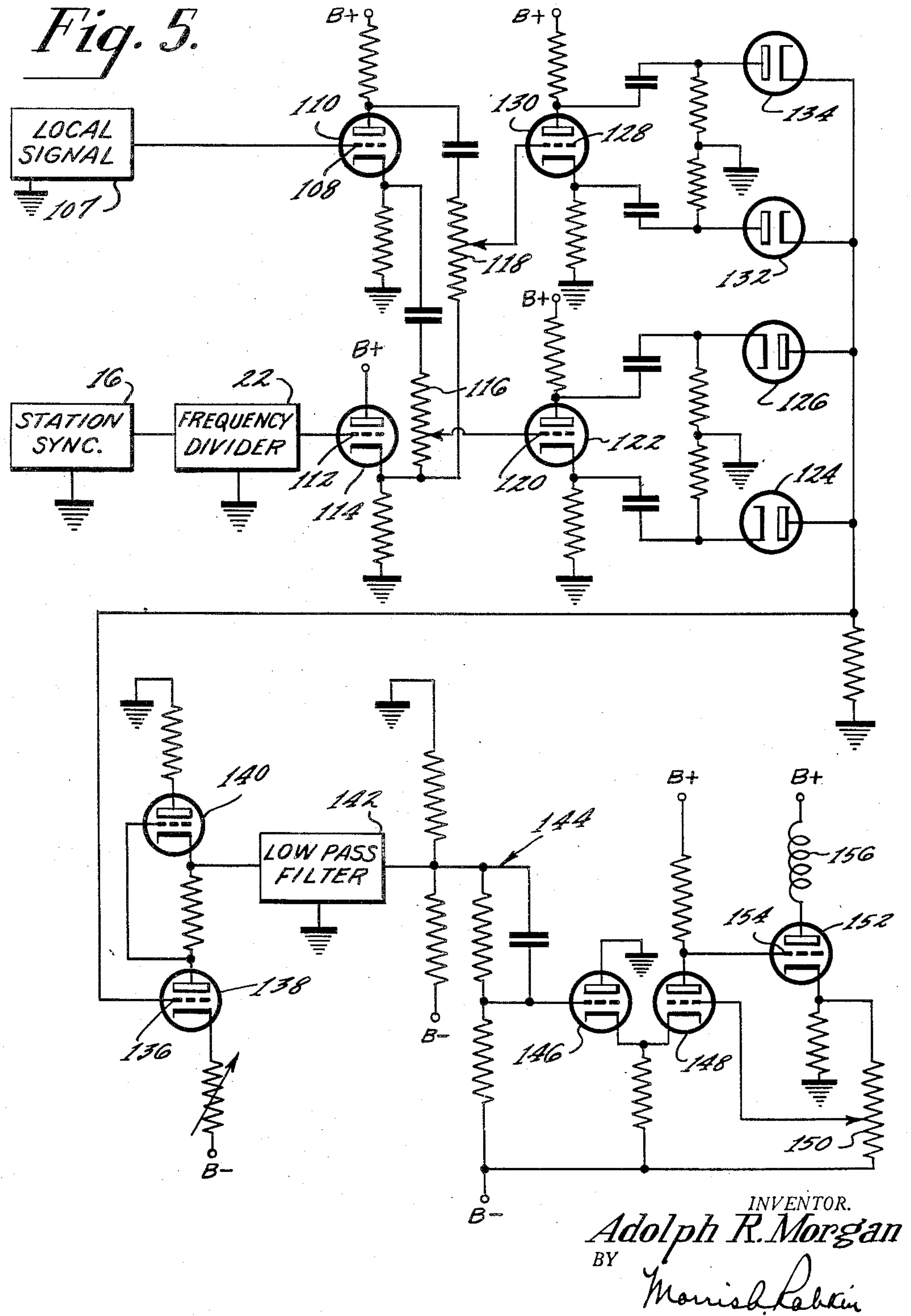
Fig. 5 is a circuit diagram illustrating details of a circuit corresponding to that portion of Fig. 2 which relates to the control of the capstan.

In Fig. 5, there is shown a circuit arrangement which may be used to control the operation of the brake 40 which, in turn, controls the operation of the capstan driving motor 26. The source of local signals 107 may, for example, be the oscillator 46 which applies a series of pulses, under the control of the signals from the fixed transducer 10, to the input of the frequency divided 48. The designation "source of local signal" of course, includes such signals as are derived from the tone wheel 30. The output of local signal source 107 is applied to the control grid 108 of a phase inverter 110. At the same time, a series of pulses from the source of control signal or station sync 16 is applied to a similar frequency divider 22. The output of this frequency divider is applied to the control grid 112 of a cathode follower amplifier 114.

Figure 6:
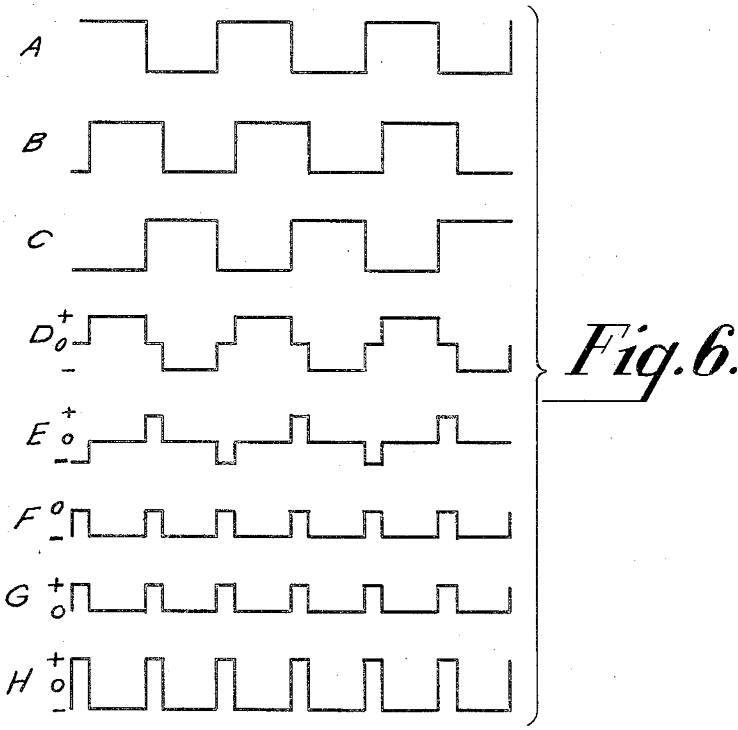
Fig. 6 is a chart illustrating the relationship of signals as they occur in the circuit shown in Fig. 5.

Referring for the moment to Fig. 6, there is shown a series of curves representative of the voltage conditions appearing at several places within the circuit shown in Fig. 5. Curve A is representative of the signals in the cathode output circuit of the phase inverter 110. These are the noninverted signals corresponding to the signals applied to the control grid thereof, which signals are derived from source of local signals 107. Curve B is representative of the output signal from the cathode follower 114 and corresponds to noninverted signals applied to the grid thereof, which signals were derived from the station sync. Curve C is a representation of the signals developed in the anode output circuit of the phase inverter 110 and corresponds to the inverted signals applied to the control grid of the phase inverter.

Each of the signals derived from the phase inverter are mixed with the signals derived from the station sync. Curve D of Fig. 6 is representative of the resultant curve obtained by the mixing of the signals represented by curves A and B in the mixing circuit 116. Curve E of Fig. 6 is representative of the resultant curve obtained by the mixing of the signals represented by curves B and C in mixing circuit 118.

The signal corresponding to curve D is applied to the control grid 120 of a phase inverter 122. In the noninverted output or cathode circuit of the phase inverter 122, there is a rectifier 124 arranged to pass only the negative portion of the signal applied thereto. Similarly, in the anode circuit or inverted output of the phase inverter 122 there is another rectifier 126 also arranged to pass only the negative portion of the signal. However, since the signal in these two portions of the circuit are inverted with respect to each other, the portion of the signal passed by one of the rectifiers corresponds to the negative portion of the signal applied to the phase inverter while the portion of the signal passed by the other of the two rectifiers corresponds to the positive portion of the signal applied to the input of the phase inverter 122. The output of these two rectifiers is combined to produce a signal represented by curve F of Fig. 6.

In a similar manner, the signal represented by curve E of Fig. 6 is applied to the control grid 128 of a phase inverter 130. In the noninverted or cathode circuit of the phase inverter 130, there is a rectifier 132 arranged to pass only the positive portion of a signal applied thereto. In the inverted output or anode circuit of the phase inverter 130, there is another rectifier 134 also arranged to pass only the positive portions of the signals applied thereto. Here again, since the signals applied to these two rectifiers are inverted with respect to each other, the signals passed by one of the rectifiers corresponds to the positive portion of the signal applied to the control grid of the phase inverter 130 while the signal passed by the portion of the other one of the two rectifiers corresponds to the negative portion of the signal applied to the input of the phase inverter 130. The signals passed by the two rectifiers 132 and 134 are combined and produce a resultant signal which is represented by the curve G of Fig. 6.

The signals represented by the curves F and G are combined to produce a resultant signal which is represented by curve H of Fig. 6. It will be noted that the curve H represents a signal which has positive components and negative components. The phase relationship of the signals applied from the two sources to the input of the tubes 110 and 114 is illustrated as being in such a relationship as to produce an error signal which would be applied to the brake 40 in such a way as to reestablish a stable condition. It will, of course, be appreciated that a stable condition arises when the signals represented by curve H have equal positive and negative components in which condition the average current or D. C. component of the error signal (curve H) is zero.

The signals represented by curve H of Fig. 6 are applied to a control grid 136 of an amplifier 138. The tube 140 connected in the anode circuit of the amplifier 138 has its control grid directly coupled to the anode of the tube 138 and serves as a variable impedance in the anode circuit of the amplifier 138 to stabilize the operation thereof. The output of the amplifier 138 is connected, through a low pass filter 142 and a phase advancing network 144, to the input of the cathode coupled amplifier comprising a first tube 146 and a second tube 148. The control grid of the second tube 148 is connected to a potentiometer 150 which is in the cathode circuit of a power amplifier 152. The control grid 154 of the power amplifier 152 is coupled to the output of the second tube 148. The coupling of the tube 148 to the potentiometer in the cathode circuit of the power amplifier 152 serves to stabilize the operation of the amplifier, reducing unwanted drift. The output of the power amplifier is applied to the energizing coil 156 of the brake 40. The current passing through the power amplifier tube 152, and hence, through the coil 156, is varied either in the positive or negative direction by the direct current components of the signal which is indicative of the phase relationship of the signals derived from the station sync 16 and the source of local signal 101.

The low pass filter 142 is adjusted and designed to remove from the signal, frequencies of the order of the repetition rate of the signal corresponding to curve H. The result of such removal is, of course, a direct current whose level is determined by the relative size of the positive and negative components, with respect to each other, of the signal represented by curve H. In this manner, the speed of rotation of the capstan motor may be controlled rather closely by a signal which is indicative of an undesirable phase relationship existing between a control or station sync signal and a local signal derived from the tape or tone wheel.

Figure 7:
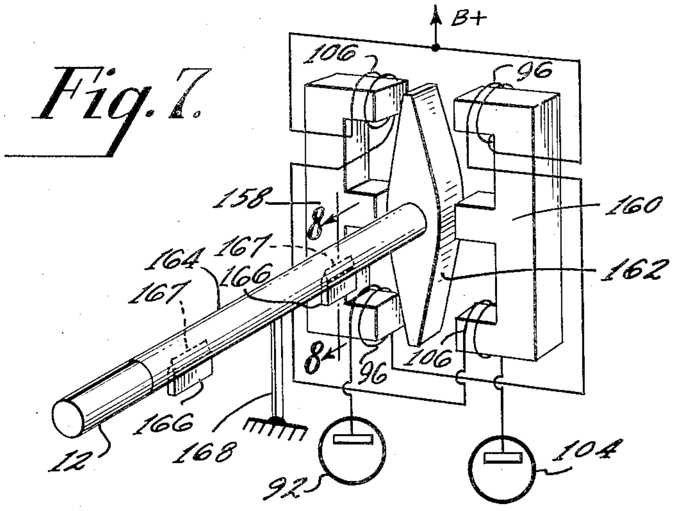
Fig. 7 is a view showing a structure providing a rotatable magnetic pickup head in accordance with the present invention.
Figure 8:
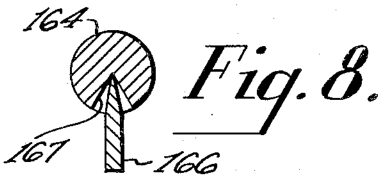
Fig. 8 is a cross sectional view taken along the line 8—8 of Fig. 7 and viewed in the direction of the arrows.

In Fig. 7, there is shown a representation of a motor of the type which may be used to control the operation of the rotatable transducer 12. The arrangement shown includes a pair of E-shaped core members 158 and 160. An armature 162 is supported for a limited rotation between the two E-shaped core members which are arranged in face to face relation with the open edges of the E's facing each other. A coil is wound on each of the four extreme legs of the E's with the diagonal coils connected in series. These coils correspond to the coils 96 and 106 described in connection with Fig. 3. One pair of diagonally opposite coils 96 are connected in the anode circuit of the power amplifier 92 and the other pair of diagonally opposite coils are connected in the anode circuit of the power amplifier 94. Extending from the armature 192 is an armature shaft 164 which is supported on appropriate knife edge pivots 166. The rotatable transducer 12 is affixed to the end of the armature shaft 164. The knife edge pivots 166 are positioned to cooperate with recesses 167 as shown in Fig. 8. The line of contact with the pivots 166 is coincident with the center of curvature of the tape contacting face of the transducer 12. With such an arrangement, the rotational movement of the head will not produce a change in the tape path, hence, introducing a spurious motion to the tape. A suitable centering bias is represented by a leaf spring 168. This centering bias serves to maintain the armature in a normally neutral position. The application of signals to the two power amplifiers in push-pull relationship causes the attractive force of one pair of diagonally opposite pole pieces to be increased while the attractive force of the other pair of diagonally opposite pole pieces is correspondingly reduced. With this arrangement, the correcting signal operates on both ends of the armature in a cooperative manner to produce the desired rotational motion of the shaft 164 and, thereby, of the rotatable transducer 12.

Thus it may be seen that there has been provided apparatus wherein a maximum fidelity of the reproduced signal is achieved through the provision of apparatus wherein a maximum of stability of motion of a record medium is afforded through the operation of a servo mechanism operating upon the capstan motor during recording. During playback, the servo mechanism operating upon the capstan is controlled by a recorded control signal faithfully reproducing the recorded signal. Any residual irregularities effectively remaining in the motion of the tape are further appreciably reduced by operation of a signal responsive servo mechanism which operates upon a motor to cause a limited rotational motion of the record transducer in a direction to neutralize the effect of such residual irregularities.

What is claimed is:

1. A magnetic recording-reproducing apparatus comprising a source of control signals, means for recording control signals from said source on a magnetic record receiving member, a rotatable capstan for driving said magnetic record receiving member, means for driving said capstan, means coupled to said capstan for producing a signal indicative of the velocity of rotation of said capstan, means operable during recording operations of said apparatus to compare the phase of signal from said source with said signals indicative of said capstan velocity, said comparing means producing a resultant signal indicative of the phase relationship of said signals, means responsive to said resultant signal for controlling the velocity of said capstan, a rotatable magnetic record transducer having a curved record contacting surface, said surface having a center of curvature, means for driving said transducer in a limited arc about an axis of rotation which coincides with said center of curvature, and means responsive to control signals for controlling the operation of said driving means.

2. A magnetic recording-reproducing apparatus comprising a source of control signals, means for recording signals from said source on a magnetic record receiving member, a capstan for driving said record receiving member, driving means for driving said capstan, means coupled to said capstan for producing a signal indicative of the velocity of rotation of said capstan, comparing means operable during recording for comparing signals from said source with said capstan velocity indicating signals, said comparing means being operable during reproducing for comparing signals from said source with said recorded signals, means including said comparing means for producing a resultant signal indicative of the phase relationship of said signals from said source with respect to said compared signals, means responsive to said resultant signal for controlling the velocity of said capstan, a rotatable magnetic record transducer having a curved record contacting surface, said curved surface having a center of curvature, means for driving said transducer in a limited arc about an axis which coincides with said center of curvature, and means responsive to control signals for controlling the operation of said transducer driving means.

3. A magnetic recording-reproducing apparatus comprising a source of control signals, means for recording signals from said source on a magnetic record receiving member, a capstan for driving said record receiving member, driving means for driving said capstan, means coupled to said capstan for producing a signal indicative of the velocity of rotation of said capstan, comparing means operable during recording for comparing signals from said source with said capstan velocity indicating signals, said comparing means being operable during reproducing for comparing signals from said source with said recorded signals, means including said comparing means for producing a resultant signal indicative of the phase relationship of said signals from said source with respect to said compared signals, brake means coupled to said capstan driving means, said brake means being responsive to said resultant signal for controlling the velocity of said capstan, a rotatable magnetic record transducer having a curved record contacting surface, said curved surface having a center of curvature, means for driving said transducer in a limited arc about an axis which coincides with said center of curvature, and means responsive to control signals for controlling the operation of said transducer driving means.

4. A magnetic recording-reproducing apparatus comprising a source of control signals, means for recording signals from said source on a magnetic record receiving member, a capstan for driving said record receiving member, driving means for driving said capstan, means coupled to said capstan for producing a signal indicative of the velocity of rotation of said capstan, comparing means operable during recording for comparing signals from said source with said capstan velocity indicating signals, said comparing means being operable during reproducing for comparing signals from said source with said recorded signals, means including said comparing means for producing a resultant signal indicative of the phase relationship of said signals from said source and said compared signals, eddy-current brake means coupled to said capstan driving means, said brake means being responsive to said resultant signal for controlling the velocity of said capstan, a rotatable magnetic record transducer having a curved record contacting surface, said surface having a center of curvature, means for driving said transducer in a limited arc about an axis of rotation which coincides with said center of curvature, and means responsive to control signals for controlling the operation of said transducer driving means.

5. A magnetic recording-reproducing apparatus comprising a source of control signals, means for recording signals from said source on a magnetic record receiving member, driving means for driving said capstan, means coupled to said capstan for producing a signal indicative of the velocity of rotation of said capstan, comparing means operable during recording for comparing signals from said source with said capstan velocity indicating signals, said comparing means being operable during reproducing for comparing signals from said source with said recorded signals, means including said comparing means for producing a resultant signal indicative of the phase relationship of said signals from said source and said compared signals, eddy-current brake means coupled to said capstan driving means, said brake means being responsive to said resultant signal for controlling the velocity of said capstan, a rotatable magnetic record transducer having a curved record contacting surface, said surface having a center of curvature, means for driving said transducer in a limited arc about an axis of rotation which coincides with said center of curvature, a second comparing means for comparing signals from said source with said recorded signals, and means including said second comparing means for producing a second resultant signal indicative of the phase relationship of said signals, said transducer driving means being responsive to said second resultant signal for controlling the operation of said rotatable transducer.

6. A magnetic recording-reproducing apparatus comprising a source of control signals, means for recording signals from said source on a magnetic record receiving member, a capstan for driving said record receiving member, driving means for driving said capstan, comparing means operable during reproducing for comparing signals from said source with said recorded signals, means including said comparing means for producing a resultant signal indicative of the phase relationship of said signals from said source and said compared signals, eddy-current brake means coupled to said capstan driving means, said brake means being responsive to said resultant signal for controlling the velocity of said capstan, a rotatable magnetic record transducer having a curved record contacting surface, said surface having a center of curvature, means for driving said transducer in a limited arc about an axis of rotation which coincides with said center of curvature, and means responsive to control signals for controlling the operation of said transducer driving means.

7. A magnetic recording-reproducing apparatus comprising a source of control signals, means for recording signals from said source on a magnetic record receiving member, driving means for driving said capstan, comparing means operable during reproducing for comparing signals from said source with said recorded signals, means including said comparing means for producing a resultant signal indicative of the phase relationship of said signals from said source and said compared signals, eddy-current brake means coupled to said capstan driving means, said brake means being responsive to said resultant signal for controlling the velocity of said capstan, a rotatable magnetic record transducer having a curved record contacting surface, said surface having a center of curvature, means for driving said transducer in a limited arc about an axis of rotation which coincides with said center of curvature, a second comparing means for comparing signals from said source with said recorded signals, and means including said second comparing means for producing a second resultant signal indicative of the phase relationship of said signals, said transducer driving means being responsive to said second resultant signal for controlling the operation of said rotatable transducer.

8. Apparatus for reproducing signals magnetically recorded on an elongated magnetic record medium comprising a magnetic record transducer having a surface adapted to cooperate with said medium, means engageable with said medium for driving said medium over a path traversing said surface of said transducer, means for applying driving forces to said transducer for moving said surface thereof in opposite directions with respect to said medium, said record medium having control signals recorded thereon, means coupled to said driving means for said medium for controlling said driving means to vary the speed of said medium inversely with respect to variations of the frequency of said control signals about a predetermined frequency, means coupled to said transducer driving means for controlling said transducer driving means to move said transducer surface in different directions with respect to said medium in accordance with the variations in frequency of said control signals about a given frequency, and means for applying said recorded control signals to said last two named means.

9. Apparatus for reproducing signals magnetically recorded on an elongated magnetic record medium comprising a magnetic record transducer having a surface adapted to contact said medium for reproducing the signals recorded thereon, means for driving said medium over a path traversing said surface of said transducer including a rotatable capstan, electromechanical means for driving said transducer in opposite directions with respect to said medium, said medium having control signals recorded thereon, independently operable circuit means for controlling the speed of said medium relative to said record contacting surface of said transducer, said circuit means including a first circuit coupled to said driving means for said medium for varying the rotational speed of said capstan inversely with respect to variations of the frequency of said control signals about a predetermined frequency and a second circuit coupled to said transducer driving means for controlling said transducer driving means to move said transducer surface in different directions with respect to said medium in accordance with the variations in frequency of said control signals about a given frequency, and means for applying said control signals simultaneously to said first and said second circuits.

10. Apparatus for reproducing signals magnetically recorded on an elongated magnetic record medium comprising a magnetic record transducer having a surface adapted to cooperate with said medium, means engageable with said medium for driving said medium over a path traversing said surface of said transducer, means for applying driving forces to said transducer for moving said surface thereof with respect to said medium, said record medium having control signals recorded thereon, means coupled to said driving means for said medium for controlling said driving means to vary the speed of said medium inversely with respect to variations of the frequency of said control signals about a predetermined frequency, means coupled to said transducer driving means for controlling said transducer driving means to move said transducer surface with respect to said medium in accordance with the variations in frequency of said control signals about a given frequency, and means for applying said recorded control signals to said last two named means.

References Cited in the file of this patent

UNITED STATES PATENTS

| | | |
|---|---|---|
| 2,000,198 | Smythe | May 7, 1935 |
| 2,647,755 | Townsley | Aug. 4, 1953 |
| 2,656,419 | Dingley | Oct. 20, 1953 |
| 2,678,821 | Masterson | May 18, 1954 |
| 2,707,212 | Hickey | Apr. 26, 1955 |
| 2,709,204 | Holmes | May 24, 1955 |